United States Patent [19]

Shigeki et al.

[11] Patent Number: 4,676,856

[45] Date of Patent: Jun. 30, 1987

[54] WEATHER STRIP FOR VEHICLE AND PRODUCING METHOD THEREOF

[75] Inventors: Kiyoshi Shigeki; Takao Nakajima, both of Shuchi, Japan

[73] Assignee: Toyoda Gosei Co., Ltd., Nishikasugai, Japan

[21] Appl. No.: 840,083

[22] Filed: Mar. 17, 1986

[30] Foreign Application Priority Data

| Mar. 18, 1985 | [JP] | Japan | 60-53897 |
| Mar. 22, 1985 | [JP] | Japan | 60-59214 |
| Mar. 29, 1985 | [JP] | Japan | 60-68113 |
| Apr. 2, 1985 | [JP] | Japan | 60-69592 |
| Apr. 3, 1985 | [JP] | Japan | 60-70597 |
| Apr. 4, 1985 | [JP] | Japan | 60-71555 |
| Apr. 25, 1985 | [JP] | Japan | 60-62492 |

[51] Int. Cl.$^4$ .................. B32B 31/16; B32B 31/26; B32B 31/30
[52] U.S. Cl. .................. 156/201; 156/244.12; 156/244.17; 156/244.24; 156/244.25; 156/273.5; 156/275.5; 428/122
[58] Field of Search .................. 156/244.12, 244.25, 156/244.17, 244.24, 273.5, 275.5, 201; 264/210.1; 428/31, 122

[56] References Cited

U.S. PATENT DOCUMENTS

| 3,068,136 | 12/1962 | Reid | 156/244.12 X |
| 3,222,769 | 12/1965 | Le Plae | 428/122 X |
| 4,188,765 | 2/1980 | Jackson | 428/122 X |

Primary Examiner—Alexander S. Thomas
Attorney, Agent, or Firm—Cushman, Darby & Cushman

[57] ABSTRACT

A weather strip for a vehicle has a channel-shaped base portion having a U-shaped cross section and provided with retaining lips for retaining a flange of a vehicle body, a seal portion integrally projecting from an outer surface of the base portion, and a core member made of synthetic resin and having a U-shaped cross section, which is embedded in the channel-shaped base portion. The method for producing such a weather strip as described above includes the steps of extruding a strip-shaped thermoplastic synthetic resin sheet having stress concentrating portions which are broken when bending stress is applied thereto, with rubber material to obtain an extruded body, heating the obtained extruded body for curing the rubber material thereof, applying bending stress to the cured extruded body for separating the core member in the stress concentrating portion and bending the separated core member with the rubber material to have a U-shaped cross section.

8 Claims, 44 Drawing Figures

FIG.6
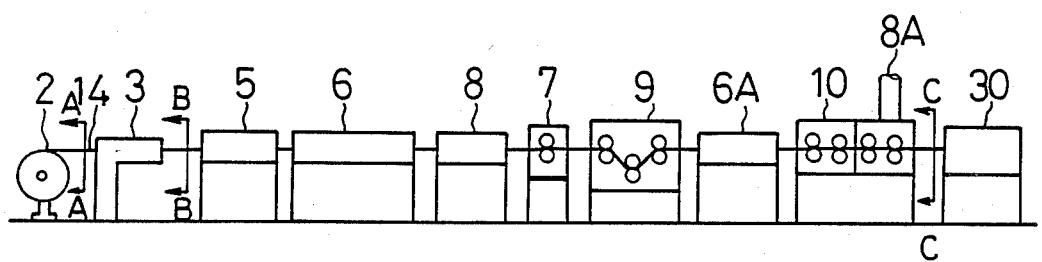
FIG.7(A)    FIG.7(B)    FIG.7(C)
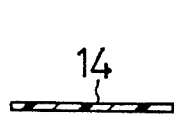 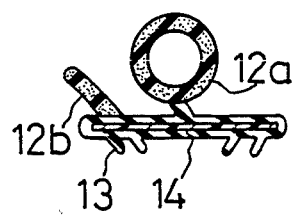 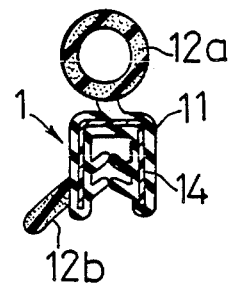
FIG.8(A)
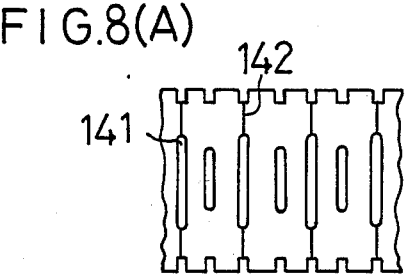
FIG.8(B)
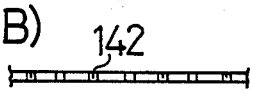

FIG. 9
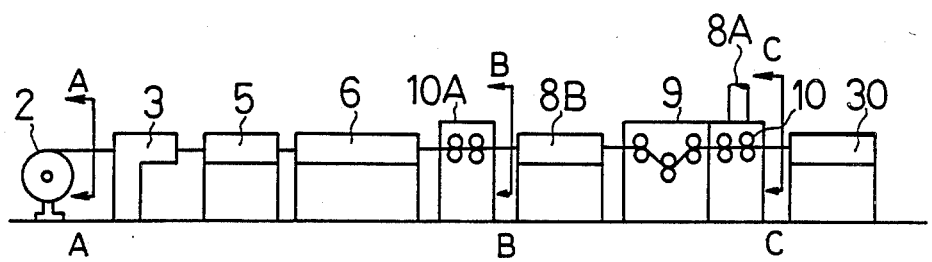
FIG. 10(A)   FIG. 10(B)   FIG. 10(C)
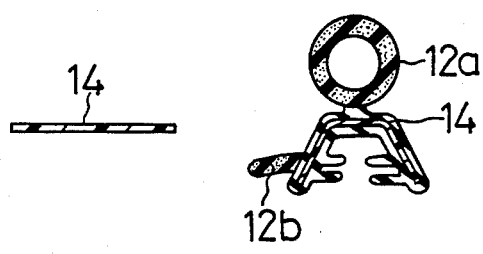 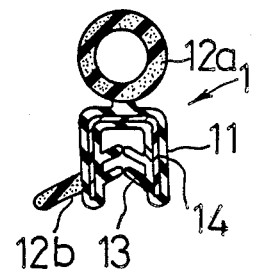

F I G.18
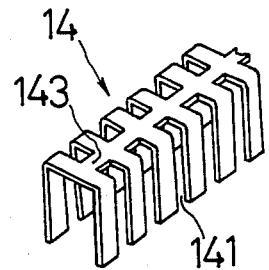
F I G.19
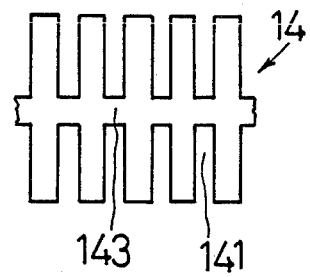
F I G.20
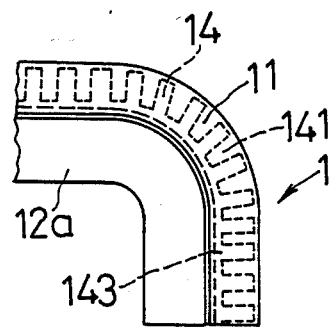

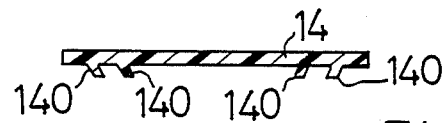
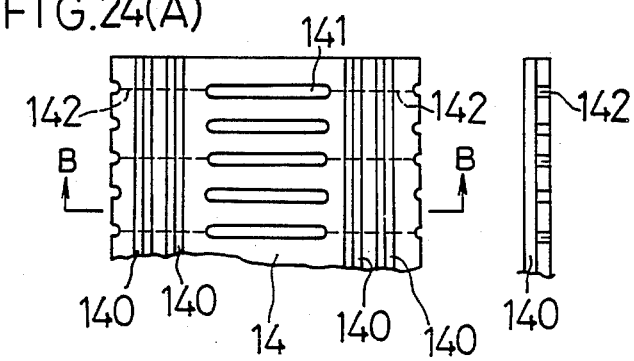
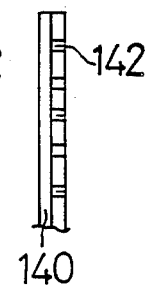
FIG.24(B)
FIG.24(A)
FIG.24(C)
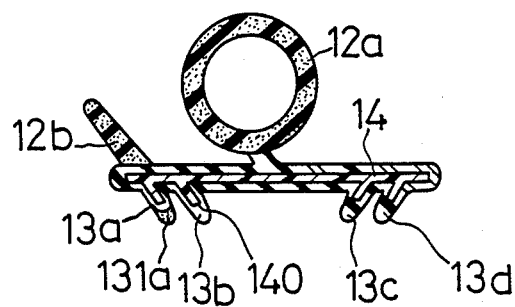
FIG.25

FIG.26
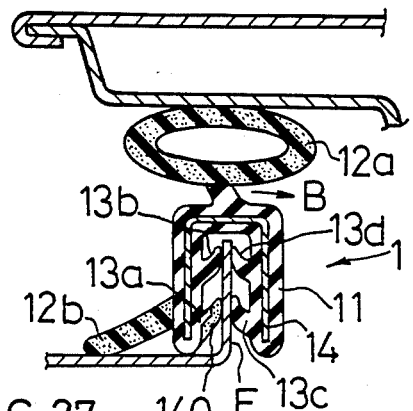
FIG.27
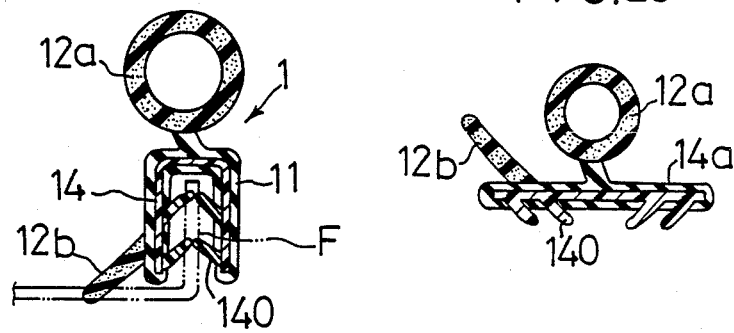
FIG.29
FIG.28(B)
FIG.28(A)
FIG.28(C)
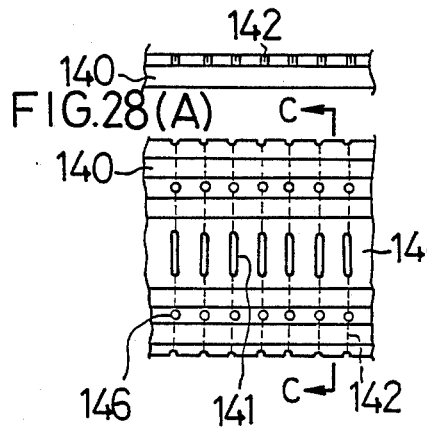

WEATHER STRIP FOR VEHICLE AND PRODUCING METHOD THEREOF

BACKGROUND OF THE INVENTION

1. Field of the Invention

The present invention relates to a weather strip to be installed along an opening of a vehicle body or a closing member such as a door and a trunk lid for closing the opening of the vehicle body.

2. Description of the Prior Art

The above described weather strip comprises a base portion 11 having a U-shaped cross section, a seal portion 12a projecting from an outer surface of the base portion 11 and if necessary, a sub-seal portion 12 as shown in FIG. 2(c).

The base portion 11 is made of solid rubber and is provided with retaining lips 13 in its inner surface for retaining a flange of the opening of the vehicle body or the like. In the U-shaped base portion is embedded a core member 14 made of a sheet metal for improving the shape-retentivity of the U-shaped base portion and increasing the retaining force for the flange. The seal members 12a and 12b are made of sponge rubber.

FIG. 3 illustrates one example of the core member 14 and FIGS. 1 and 2 illustrate the conventional producing process of a weather strip in which the core member 14 is embedded.

The core member 14 is provided with slots 141 in a strip-shaped sheet metal at regular intervals in the longitudinal direction thereof. And cut lines 142 are formed from both ends of every other slots 141 to both side edges of the sheet metal.

When bending stress is applied to the sheet metal in the direction perpendicular to the surface thereof, the bending stress is concentrated to the cut lines 142. This results in the sheet metal being broken in the cut lines 142 to be separated into a large number of core pieces.

At first the core member 14 made of a sheet metal is fed out of a reel 2 and is extruded with solid rubber and sponge rubber by means of an extruder 3 to obtain an extruded body.

FIG. 2(B) illustrates the section of the extruded body. The core member 14 is covered with solid rubber and retaining lips 13 project from the under surface of the solid rubber while the seal portions 12a and 12b made of sponge rubber project from the upper surface of the solid rubber.

Next, the extruded body is fed to a high frequency induction heating apparatus 4 and then fed to a high frequency dielectric heating apparatus 5.

In the high frequency induction heating apparatus 4, the core member 14 is heated up to 120° to 150° C. and in the high frequency dielectric heating apparatus 5, the rubber material is heated up to about 200° to 220° C.

The extruded body is kept at about 200° C. while passing a hot air bath 6 to be cured. The cured body is received by a receiver 7 and is cooled in a cooling bath 8.

In the high frequency dielectric heating, the temperature of the rubber rises but that of the metallic core member does not rise. This results in the heat of the rubber in the vicinity of the unheated core member being taken away thereby and accordingly the rubber in the vicinity of the unheated core member being not cured.

In order to prevent the above phenomena, conventionally, the metallic core member 14 is previously heated in the high frequency induction heating process prior to the high frequency dielectric heating process.

The cooled extruded body is then fed to a core member separator 9. In the separator, bending stress is repeatedly applied to the extruded body by rollers in the direction perpendicular to the surface of the extruded body. This results in the core member 14 within the extruded body being broken in the cut lines 142 to be separated into a large number of core pieces.

And then the extruded body is fed to a bending machine 10. In this step, the solid rubber portion enclosing the core member 14 is bent to form the base portion 11 having a U shaped section as shown in FIG. 2(c). Thus, a weather strip is obtained. The obtained weather strip is cut to a predetermined length by means of a cutter 30.

A weather strip is required to be of light weight as well as to have a good sealing force. For achieving the above requirement, the sheet metal for the core metal has been made thinner. Generally, the thickness of the sheet metal is about 0.5 mm and recently the sheet metal as thin as about 0.4 mm has been also employed. However, it is very difficult to make the sheet metal thinner than 0.4 mm.

In addition, in the weather strip in which the core member is embedded, there often occurs that the rubber cover covering the core member is torn and accordingly, the core member is exposed to the outside of the weather strip.

The rubber cover is easily torn particularly in the vicinity of an edge of the core member.

The exposure of the core member makes the obtained weather strip poor looking and incurs a problem that the exposed core member becomes rusty and accordingly, corrosion expands throughout the core member.

As described above, a long process is needed to produce the weather strip enclosing the core member. Therefore, a simplified method has been required.

Particularly, in the core member separation process for breaking the metallic core member, bending stress must be repeatedly applied to the core member. Usually, fifteen stations are necessary. In addition, large load as large as 4 kg/cm$^2$ is required to bend the core member into the U-shaped cross section.

Under the above circumstances, simplification of the production process, particularly the core member separation process and the core member bending process has been strongly desired.

SUMMARY OF THE INVENTION

One object of the present invention is to provide a weather strip of ligh weight, which is free from the tear of a cover member due to a core member and the formation of rust in the core member.

Another object of the present invention is to provide a weather strip which is excellent in flexibility, and is easily mounted on corner portions particularly.

Still another object of the present invention is to provide a weather strip which is firmly attached to a vehicle body and is excellent in sealing property.

Further object of the present invention is to provide a producing method of a weather strip, which facilitates the separation of the core member and the bending operation.

The weather strip of the present invention is characterized in that a core member made of synthetic resin is embedded in a channel-shaped base portion having a U-shaped section. As the synthetic resin for the core member is employed thermoplastic synthetic resin such as ABS resin, vinyl chloride resin, polypropylene, and nylon.

By employing a core member made of synthetic resin, the weather strip can be made much lighter as compared with the conventional weather stip having a metallic core member, and the tear of the rubber cover due to the core member can be prevented.

In the weather strip of the present invention, two tupes of core member, i.e. separate type and connected type can be embedded.

The separate type of core member is composed of a large number of core pieces which are separately embedded at regular intervals in its longitudinal direction and the connected type of core member is composed of a large number of core pieces which are integrlyy connected.

The latter type of core member is superior to the former type of core member in that the weather strip is not successively elongated when being attached to the vehicle body, but inferior to the former type in flexibility.

However, the core member of connected type, made of synthetic resin is more flexible than that made of metal, and accordingly can be easily attached to corner portions.

The method for producing the weather strip having the core member made of synthetic resin comprises an extrusion process of integrally extruding the core member and a rubber material to obtain an extruded body, a cure process of curing the rubber material of the extruded body, a cooling process of cooling the cured extruded body, a separation process of separating the core member to a large number of core pieces by bending the cooled extruded body, a core pieces preheat process of softening the core pieces by heating the extruded body having the core pieces, and a base portion forming process of bending the extruded body with the softened core pieces to have a U-shaped section.

In place of the above described cooling process, the extruded body can be gradually cooled after the cure process. In this case, the core member is broken and bent to a U-shaped section in the half hardened state.

In both methods, the core member made of synthetic resin can be easily broken and bent to a U-shaped section as compared with the conventional metallic core member.

BRIEF DESCRIPTION OF THE DRAWINGS

FIG. 6 is a view illustrating one embodiment of a producing method according to the present invention;

FIGS. 7(A), 7(B) and 7(C) are sectional views taken along the lines A—A, B—B and C—C of FIG. 6, respectively;

FIGS. 8(A) and 8(B) are a plan view and a side view of a sheet made of synthetic resing for a core member to be supplied to the producing processes of FIG. 6, respectively;

FIG. 9 is a view illustrating another embodiment of a producing method according to the present invention;

FIGS. 10(A), 10(B) and 10(C) are sectional views taken along the lines A—A, B—B and C—C of FIG. 9, respectively;

FIG. 18 is a perspective view of a further embodiment of a core member according to the present invention;

FIG. 19 is a plan view of a sheet made of synthetic resin for a core member of FIG. 18 in the state before the bending process;

FIG. 20 is a side view of a curved weather strip in which the core member of FIG. 18 is embedded;

FIG. 24(A) is a plan view of a sheet made of synthetic resin for a still further embodiment of a core member according to the present invention;

FIG. 24(B) is a sectional view taken along the line B—B of FIG. 24(A);

FIG. 24(C) is a side view of the sheet of FIG. 24(A);

FIG. 25 is a sectional view of a half-finished weather strip using the plate made of synthetic resin shown in FIGS. 24(A), 24(B) and 24(C);

FIG. 26 is a sectional view of a weather strip using the plate made of synthetic resin shown in FIGS. 24(A), 24(B) and 24(C), which is installed in a vehicle;

FIG. 27 is a sectional view of still another embodiment of a weather strip according to the present invention;

FIG. 28(A) is a plan view of a sheet made of synthetic resing for a core member used for producing the weather strip of FIG. 27;

FIG. 28(B) is a side view of the sheet of FIG. 28(A);

FIG. 28(C) is a sectional view taken along the line C—C of FIG. 28(A);

FIG. 29 is a sectional view of a half-finished weather strip using the sheet shown in FIGS. 28(A), 28 (B) and 28(C)

DETAILED DESCRIPTION OF THE INVENTION

Figure 4:
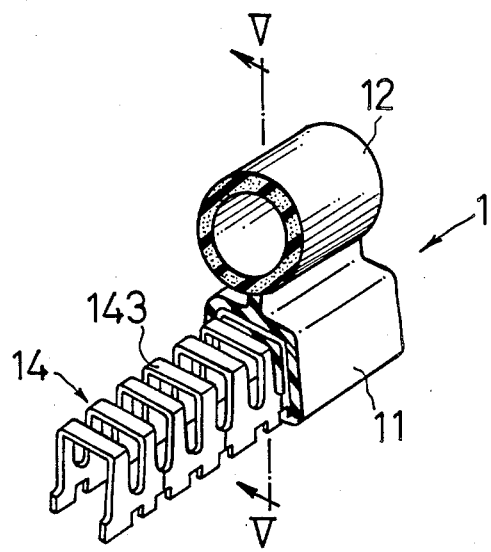
FIG. 4 is a partially cut away perspective view of one embodiment of a weather strip according to the present invention, in which a core member made of synthetic resin is embedded.
Figure 5:
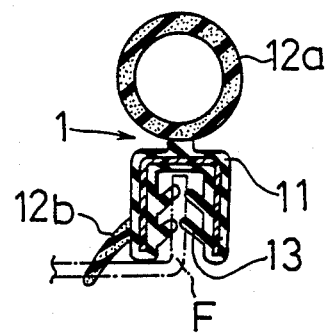
FIG. 5 is a sectional view taken along the line V—V of FIG. 4.

FIGS. 4 and 5 illustrate a first embodiment of a weather strip to be installed in an opening edge of a trunk room of a vehicle.

A weather strip 1 is provided with a base portion 11 made of solid rubber and having a V-shaped section to be attached to a flange F of the opening edge of the trunk room, a hollow sealing portion 12a made of sponge rubber, which projects from the base portion 11 and comes in contact with a trunk lid (not shown), and a lip-shaped sealing member 12b made of sponge rubber, which also projects from the base portion 11 and is in contact with a body panel 7.

From an inner surface of the base portion 11 project opposing retaining lips 13 for retaining the weather strip 1 to the flange F.

In the base portion 11 is embedded a core member 14. The core member 14 is made of thermoplastic synthetic resin such as vinyl chloride resin, ABS resin, polypropylene, and nylon and is separated to a large number of core pieces 143.

The core member 14 has the shape similar to that of the conventional core member.

FIG. 8 illustrates one example of the core member 14. In a strip-shaped flat sheet, are formed transversely extending slots 141 at regular intervals in the longitudinal direction of the flat sheet. And cut lines 142 are formed between both ends of every other slots 141 and both side edges of the flat sheet. The slits 142 composes stress concentrating portions to which stress is concentrated when bending stress is applied to the core member 14.

FIGS. 6, 7(A), 7(B) and 7(C) illustrate the method for producing the above described weather strip in which the core member made of synthetic resin is embedded.

Figure 1:
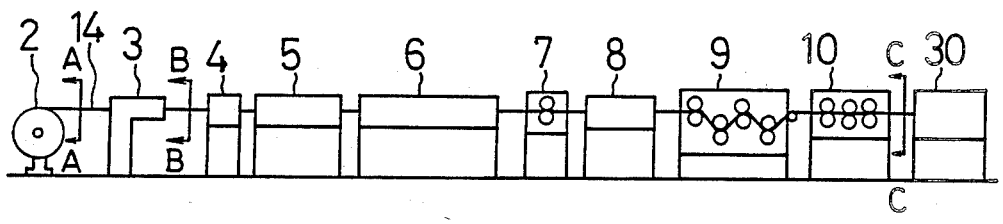
FIG. 1 is a view illustrating the conventional producing processes of a weather strip.
Figures 2A, 2B, 2C:
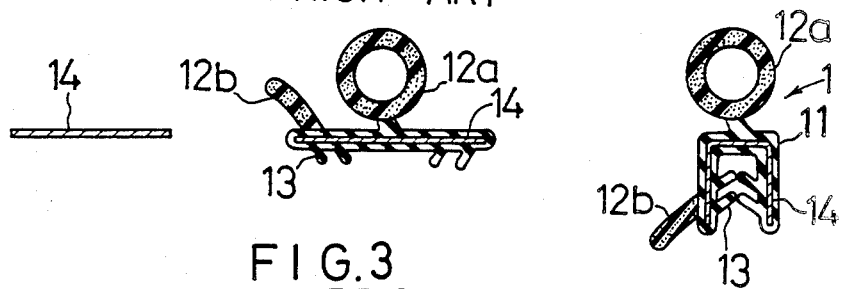
FIGS. 2(A), 2(B) and 2(C) are sectional views taken along the lines A—A, B—B and C—C of FIG. 1, respectively.

This method will be explained, comparing with the conventional method illustrated in FIGS. 1 and 2.

At first, in the core member supply process, a flat sheet-shaped core member 14 (FIG. 7(A)) is fed from a reel 2. Next, in the extrusion process, the core member 14 is integrally extruded with a rubber material by means of an extruder 3 to obtain an extruded body.

FIG. 7(B) illustrates the extruded body. The core member 14 is covered with solid rubber and seal portions 12a, 12b made of sponge rubber project from the solid rubber.

Then, the extruded body is fed to the next cure process. In the cure process, the extruded body is heated up to about 120° to 150° C. by a high frequency dielectric heating apparatus 5 and is cured while passing a hot air bath 6 of 200° to 220° C.

Next, the cured extruded body is cooled in a cooling bath 8 and is received by a receiver 7.

In the next core member separation process, bending stress is applied to the cooled extruded body by a separator 9 in the direction perpendicular to the surface of the core member 14 embedded in the extruded body. As a result, the core member 14 is broken in the slits 142 (FIG. 8) as the stress concentrating portions.

In this case, the number of stations of rollers can be reduced since the core member made of synthetic resin is easily broken as compared with the metallic core member.

Next, the extruded body is heated up to about 120° C. in a preheating bath 6A so that the core member 14 is softened. Then, in the base portion forming process, the base portion in which the core member 14 is embedded, is bent to have a V-shaped section by means of a bending apparatus 10.

The core member 14 made of synthetic resin, which is preheated up to about 120° C. in the preheating bath 6A can be bent to have a V-shaped section by much smaller stress as compared with the metallic core member.

The obtained weather strip is immediately cooled by a cold air supplying apparatus 8A so that the V-shaped form of the core member 14 is maintained.

Next, the cooled weather strip is cut to a predetermined length by a cutter 30.

FIGS. 9, 10(A), 10(B) and 10(C) illustrate another method for producing the weather strip.

This method is equal to the above described method in the processes where the flat sheet-shaped core member is extruded with the rubber material and the obtained extruded body is cured.

According to this method, the cured extruded body is preformed by a bending apparatus 10A.

In this process, the rubber portion enclosing the core member 14 in the softened state, is bent at such a small bending angle as not to form a V-shaped section, as shown in FIG. 10(B).

The preformed extruded body is fed to a gradually cooling bath 8B and gradually cooled to about 120° to 100° C. so that the core member 14 becomes half-softened state.

Then, the core member in this state is broken by the core member separator 9 and immediately bent to have a V-shaped section by the bending apparatus 10. The core member 14 in this state can be easily broken and bent to have a V-shaped section since it is subjected to the preforming process.

The bent extruded body is immediately cooled by the cold air supplying apparatus 8A. This results in the V-shaped section being maintained.

Thus, the weather strip 1 as shown in FIG. 10(C) is obtained. The obtained weather strip 1 is cut to a predetermined length by the cutter 30.

The weight of the synthetic resin as the material of the core member 14 is about one-sixth to one-seventh of that of the conventional core member made of iron. And accordingly, even when a core member made of synthetic resin, having a thickness of 1 mm is employed, the weight thereof is only about one-third of that of the conventional core member having a thickness of 0.5 mm. This results in the weight of the weather strip being reduced.

The conventional core member made of iron has a problem that fins are formed in edges of cut portions and punched portions thereof to tear the cover member made of rubber when the weather strip is curved along the corner portion.

In contrast, in the core member made of synthetic resin, such fins are scarcely formed when being punched. Even if fins are formed, heat in the cure process softens synthetic resin to round the formed fins. Furthermore, since the synthetic resin is softer than the metallic material, the cover member is scarcely torn.

In addition, the core member made of synthetic resin does not rust.

Furthermore, the breakage in the cut lines 142 in the core member separation process can be easily performed by applying small stress as compared with the case of the core member made of iron.

And the bending process of the core member made of synthetic resin can be easily performed with small stress by heating and softening the core member made of synthetic resin.

Furthermore, the weather strip enclosing the core member made of synthetic resin can be easily cut by the cutter as compared with that enclosing the core member made of iron.

Hereinafter, a second embodiment of the weather strip according to the present invention and the producing process thereof will be explained with reference to FIGS. 11, 12(A), 12(B), 12(C) and 12(D).

Figure 12A:
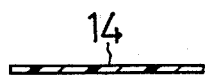
FIGS. 12(A), 12(B), 12(C) and 12(D) are sectional views taken along the lines A—A, B—B, C—C and D—D of FIG. 11, respectively.
Figure 12B:
Figures 12C, 12D:
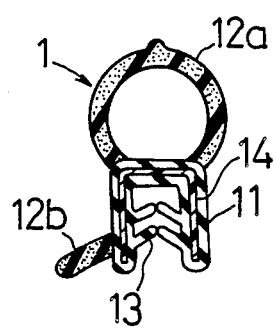

As shown in FIG. 12(D) both ends of the hollow seal portion 12a are positioned at bent portions of the base portion 11 having a V-shaped section. The other structure of the second embodiment of the weather strip is substantially equal to that of the first embodiment of the weather strip shown in FIGS. 4 and 5.

Figure 11:
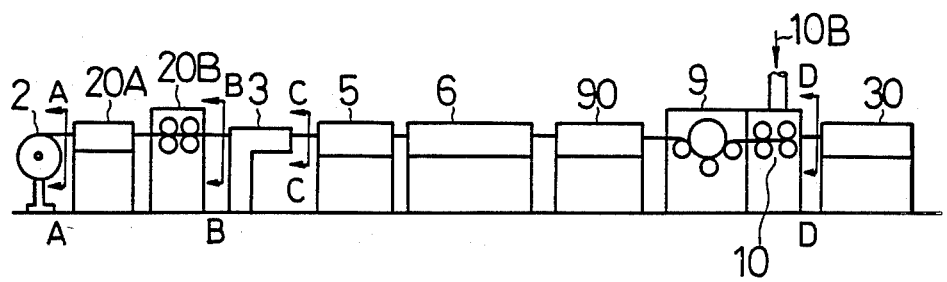
FIG. 11 is a view illustrating still another embodiment of a producing method according to the present invention.

In the weather strip of this type the seal portion 12a is liable to be torn in its both ends when the cured base portion 11 enclosing the core member 14 is bent to have a V-shaped cross section. In order to prevent the above phenomena, according to the present invention, the producing method as shown in FIG. 11 and FIG. 12 is employed.

Figure 3:
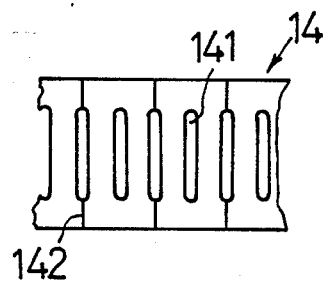
FIG. 3 is a plan view of a metallic sheet for a conventional core metal to be suppleid to the producing processes of FIG. 1.

From the reel 2 is fed out the core member 14 (FIG. 12(A)) having the shape similar to that shown in FIG. 3 and made of synthetic resin such as ABS resin. The core member 14 is preheated up to about 160° C. in a preheating bath 20A and is bent at such a smaller bending angle as not to form a V-shaped section as shown in FIG. 12(B) by a bending apparatus 20B. The core member made of synthetic resin can be easily bent by small load as compared with the metallic core member.

Next, the obtained core member 14 is extruded by means of the extruder 3 with solid rubber and sponge rubber. In the extruded body, the core member 14 is covered with solid rubber, the retaining lips 13 project from the inner surface of the solid rubber and the seal portions 12a and 12b project from the outer surface of the solid rubber as shown in FIG. 12(C).

Then, the extruded body is subjected to the cure process. In the cure process, the core member 14 and the rubber are heated together up to 120° to 150° C. by the high frequency dielectric heating apparatus 5 and is cured while being passed in the hot air bath 6 of 200° to 220° C.

The cured extruded body is gradually cooled to about 100° C. in a gradually cooling bath 90 so that the core member 14 becomes half-hardened state. The core member 14 in this state is broken in its cut lines 142 (FIG. 3) by the core member separator 9 composed of a roller of a large diameter and rollers of a small diameter. And immediately, the extruded body is bent to have a V-shaped section by means of the bending machine 10 and is cooled by a cold air supplying apparatus 10B so as to keep up its form. Thus, the weather strip shown in FIG. 12(D) is obtained.

In this case, the core member 14 in the half-hardend state can be easily broken and bent.

At last, the obtained weather strip is cut to a predetermined length by the cutter 30.

In the case of the weather strip having a metallic core member, it is extremely difficult to break the core member of the shape shown in FIG. 12(C).

In contrast, according to the present invention, the core member made of synthetic resin can be easily broken.

Hereinafter, a third embodiment of the weather strip according to the present invention will be explained with reference to FIG. 13.

The structure of the third embodiment of the weather strip is substantially equal to that of the first embodiment of the weather strip shown in FIGS. 4 and 5 except for the shape of the core member.

Figure 13:
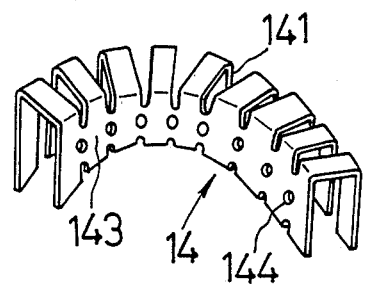
FIG. 13 is a perspective view of another embodiment of a core member according to the present invention.

The core member 14 of the third embodiment has such a shape that one side portion thereof continues in its longitudinal direction to form a continuation portion 143 as shown in FIG. 13. The upper portion and the other side portion of the bent core member 14 are separated by the slots 141 at regular intervals in its longitudinal direction.

When the weather strip of the third embodiment is attached to an opening of a vehicle body, the continuation portion 143 is positioned on the side of inner diameter of a corner thereof.

In the continuation portion 143 are formed holes 144 for increasing the adhesion of the core member 14 to rubber material.

In the case of the weather stip having separated core pieces, undesirable slack and elongation are liable to be formed when such a weather strip is attached along an opening of a vehicle body, particularly along a corner portion thereof.

In contrast, in the case of the weather strip of the third embodiment, the side portion of the core member 14, which is positioned on the inner diameter side of the corner portion, continues in its longitudinal direction. This results in undesirable slack and elongation being not formed in the attached weather strip.

Furthermore, since the weather strip of the third embodiment is made of synthetic resin, the continuation portion 143 can be much easily deformed as compared with the conventional metallic core member.

Hereinafter, the producing method of the weather strip of the third embodiment will be explained with reference to FIGS. 14 and 15.

Figure 14:
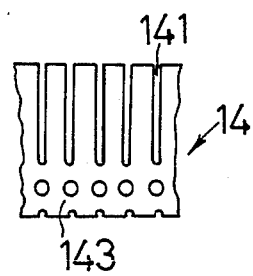
FIG. 14 is a plan view of a sheet made of synthetic resin for a core member of FIG. 13 in the state before the bending process.

As shown in FIG. 14, in a strip-shaped sheet made of thermoplastic synthetic resin are formed a continuation portion 143 in one side portion thereof and transversely extending slots 141 in the remaining portion. The continuation portion 143 continues in the longitudinal direction of the sheet and the transversely extending slots 141 are formed at regular intervals in the longitudinal direction of the sheet.

Thus, the core member 14 of the third embodiment to be subjected to the extrusion process is obtained.

In the extrusion process, the core member 14 shown in FIG. 14 is extruded together with rubber material.

The obtained extruded body is subjected to the next cure process. At first, the extruded body is heated up at about 120° to 150° C. by the high frequency dielectric heating apparatus and then cured while being passed the hot air bath of about 200° to 220° C.

Next, the cured body is fed to the gradually cooling bath and then is gradually cooled to about 120° to 140° C. so that the core member 14 becomes such softened state as enabling the bending work.

The softened body is subjected to the base portion forming process. In this process, the solid rubber portion enclosing the core member 14 is bent to have a V-shaped cross section by the bending machine 9.

The producing method of the third embodiment of the weather strip does not require any cover member separation process.

FIG. 13 illustrates the bent core member 14 which is curved along a corner portion to which the weather strip is attached.

Next, the weather strip is cooled by the cold air supplying apparatus so that V-shaped section of the core member 14 is maintained.

At last, the cooled weather strip is cut to a predetermined distance by the cutter.

Figure 15:
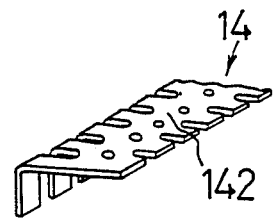
FIG. 15 is a perspective view of a sheet made of synthetic resin for a core member of FIG. 13 in the state after the pre-bending process.

According to the present embodiment, the core member 14 may be bent in one side portion thereof before the extrusion process as shown in FIG. 15.

Hereinafter, another producing method of the weather strip provided with the core member made of synthetic resin, of which one side portion continues in the longitudinal direction thereof and the remaining portion is separated in the longitudinal direction at regular intervals, will be explained with reference to FIGS. 16 and 17.

At first, in a strip-shaped sheet made of thermoplastic synthetic resin are formed a continuation portion 143 in one side portion thereof, transversely extending slots 141 in the central portion thereof and transversely extending short slots 141' in the other side portion thereof. The continuation portion 143 continues in the longitudinal direction of the sheet, the slots 141 and 141' are formed at the same regular intervals in the longitudinal direction of the sheet so as to be opposed to each other through narrow connecting portions. In each of the connecting portions is formed a cut line 142.

Figure 17:
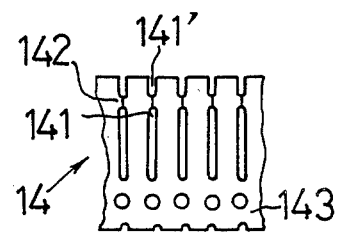
FIG. 17 is a plan view of a sheet made of synthetic resin for a core member of FIG. 16 in the state before the bending process.

Thus, the core member 14 as shown in FIG. 17 is obtained.

The obtained core member 14 is extruded together with the rubber material to form an extruded body. This extruded body is cured and is cooled in the cooling bath until the core member 14 becomes the hardened or half hardened state.

Next, while the extruded body is passed through the rollers of the core member separator, bending stress is applied to the solid rubber portion enclosing the core member 14 in the direction perpendicular to the surface of the core member. This results in the core member 14 being cut in the cut lines 142.

Figure 16:
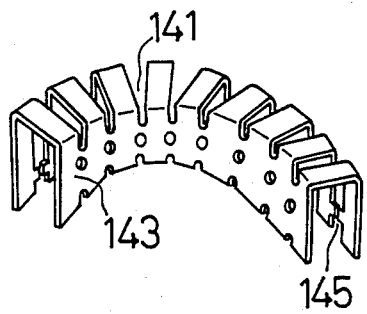
FIG. 16 is a perspective view of still another embodiment of a core member according to the present invention.

Then, the extruded body is heated in the preheating bath to soften the core member 14, and the solid rubber portion enclosing the core member 14 is bent to have a V-shaped section by the bending machine as shown in FIG. 16.

The obtained weather strip is substantially equal to that using the core member shown in FIG. 13 except that the broken portions 145 are formed in the core member 14.

In the case of the core member shown in FIG. 14, the portions defined by the slots are often deformed in the extrusion process.

In contrast, in the case of the core member shown in FIG. 17, no deformation is formed in the core member in the extrusion process since both side portions thereof are integrally continues, respectively.

Hereinafter a fourth embodiment of the weather strip according to the present invention with reference to FIGS. 18, 19 and 20.

The core member made of synthetic resin according to the present invention can have various forms.

For example, the core member 14 shown in FIG. 18 is provided with a longitudinally extending connecting portion 143 in its central portion and transversely extending slots 141 in both side portions of the core member. The slots 141 are formed at regular intervals in the longitudinal direction of the core member 14.

At first, slits 141 are formed in a strip-shaped sheet by the punching operation and the obtained core member 14 (FIG. 19) and the rubber material are extruded and the extruded body is subjected to the cure process, the gradually cooling process and the base portion forming process similar to the third embodiment.

FIG. 20 shows the obtained weather strip which is curved along a corner portion so that the base portion 11 is positioned on the outer diameter side thereof and the hollow seal portion 12a is positioned on the inner diameter side thereof. Since the core member 14 is longitudinally connected by the connecting portion 143, undesirable slack and elongation are not formed when this weather strip is attached to the corner portion. The core member 14 made of synthetic resin is excellent in flexibility as compared with the metallic core member of the same shape. This results in the weather strip of the fourth embodiment being smoothly curved along a corner portion and firmly attached thereto.

In the case of the core member made of synthetic resin, fins are not so often formed as the case of the metallic core member in the punching process of the slots 141.

And even if the fins are formed, they are made round upon receiving heat in the cure process. Therefore, the tear of the rubber material due to the formation of the fins can be prevented.

Hereinafter, a fifth embodiment of the weather strip will be explained with reference to FIGS. 21 and 22.

When the weather strip shown in FIG. 5 is attached to a flange F, the sub-seal portion 12b receives counterforce from a body panel (not shown) and accordingly, the weather strip is inclined to the opposite side of the sub-seal portion 12b.

And when the seal poriton 12a of the weather strip in this state is pushed down by a trunk lid or the like, the weather strip is further inclined to the opposite side of the sub-seal portion 12b. This results in the sealing force of the sub-seal portion 12b and the retaining lips 13 being lowered and accordingly, water sometimes entering the interior of the base portion 11.

In order to overcome the above defect, it has been tried to improve the adhesion of the weather strip to the flange F by forming a top end of each retaining lip of sponge rubber. However, sufficiently good sealing effect cannot be obtained.

Figure 21:
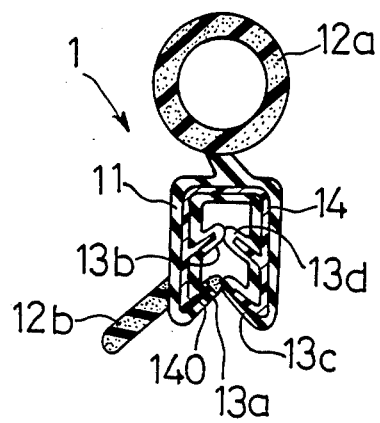
FIG. 21 is a sectional view of another embodiment of a weather strip according to the present invention.
Figure 22:
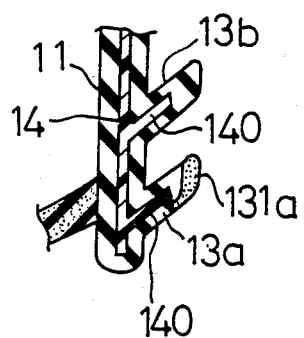
FIG. 22 is an enlarged view of a main portion of FIG. 21.
Figure 23:
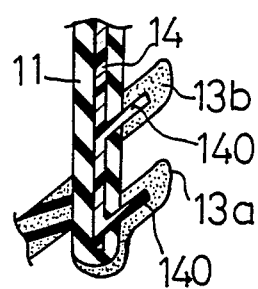
FIG. 23 is an enlarged view of a modified embodiment of the main portion shown in FIG. 22.

FIGS. 21 to 23 illustrate a fifth embodiment of the weather strip free from the above described undesirable inclination and having excellent sealing effect.

The weather strip 1 is provided with a base portion 11 having a V-shaped section, a hollow sealing portion 12a and a lip-shaped sub-seal portion 12b. And lips 13a, 13b, 13c and 13d project from opposed inner surfaces of the base portion 11 for retaining a flange of a vehicle body.

In the base portion 11 is embedded the core member 14 made of synthetic resin such as vinyl chloride resin and ABS resin.

The core member 14 is provided with projections 140, each extending from the base of each lip to the middle portion thereof.

Only the lip 13a positioned on the side of the sub-seal portion 12b i.e. the outer side of a vehicle when the weather strip is attached, has a top end portion 131a made of sponge rubber. The other portion of the base portion 11 is made of solid rubber.

Instead, the top end of each of the lips 13a and 13b may be formed of sponge rubber.

In addition, the whole portion of the lips 13a and 13b may be formed of sponge rubber as shown in FIG. 23.

Hereinafter, the method for producing the weather strip of the fifth embodiment will be explained with reference to FIGS. 24 and 25.

FIG. 24 illustrates the core member 14.

At first, a strip-shaped sheet made of synthetic resin having two lines of projections 140 projecting from both side portions of one surface thereof is formed by extruding. An in the obtained extruded sheet are formed transversely extending slots 141 by punching so as to be arranged at regular intervals in the longitudinal direction thereof.

At this time, cut lines 142 are formed in the other surface of the extruded sheet form both ends of every other slots 141 to the both side edges of the extruded sheet.

Thus, the core member 14 is formed.

The obtained core member 14 and rubber material is extruded to obtain a half-finished weather strip shown in FIG. 25.

In the half-finished weather strip shown in FIG. 25, only a top end portion 131a of the retaining lip 13a is made of sponge rubber.

Next, bending stress is repeatedly applied to the portion in which the core member 14 is embedded in the direction perpendicular to the surface thereof. This results in the cut lines 142 being broken to be separated to core peices.

Thereafter, the portion in which the core member 14 is embedded is bent to have a V-shaped section. Thus, the weather strip 1 shown in FIG. 21 is obtained.

The obtained weather strip 1 is excellent in smoothly curved along a corner portion since the core member 14 is separated into core pieces.

Furthermore, the obtained weather strip 1 has improved rigidity dur to the projections 140 embedded in the lips 13a, 13b, 13c and 13d.

As shown in FIG. 26, when the weather strip is attached to a flange of a vehicle body, force in the direction of the arrow B is applied to the weather strip. However, according to the fifth embodiment, undesirable inclination of the weather strip can be prevented by virtue of the counter force of the retaining lips 13b and 13c.

Furthermore, the core member 14 is made of synthetic resin so that the projections 140 of the core member 14 within the retaining lips can bend when the flange is forcibly inserted between the retaining lips, as is different from the metallic core member.

This redults in the load applied to the flange being not largely increased and accordingly the rubber of the retaining lips hardly breaking due to the exposure of the projections.

And even if part of the projections should be exposed out of the rubber of the retaining lips and come in contact with the inserted flange, the projections made of synthetic resin does not damage the flange.

As described above, the weather strip of this embodiment is free from the undesirable inclination to the inner side of a vehicle, and the top end portion of at least the retaining lip 13a out of the retaining lips 13a and 13b positioned on the outer side of a vehicle is made of sponge rubber and is in close contact with the flange F.

Therefore, water can be prevented from entering the interior of the weather strip.

In addition to the top end of the retaining lip 13a, the top end of each of the retaining lip 13b and the retaining lip 13d positioned on the upper inner side of a vehicle may also be made of sponge rubber.

In any case, it is preferable to form the whole retaining lip 13c on the lower inner side of a vehicle, which most strongly receives the inclination force of the weather strip, of solid rubber.

Hereinafter, a sixth embodiment of the weather strip according to the present invention will be explained with reference to FIG. 27.

In the weather strip of which the retaining lips projecting from the inner surface of the base portion having a V-shaped section retain a flange of a vehicle body, if sufficiently large retaining force of the retaining lips to the flange cannot be obtained, it is feared that water enter the interior of the base portion.

However, if the retaining force is increased too much for overcoming the above fear, the inserting load of the flange becomes too large when the weather stip is attached to the flange.

FIG. 27 illustrates the weather strip of which the retaining force is improved without increasing the inserting load of the flange.

As shown in FIG. 27, the weather strip 1 is provided with the base portion 11 having a V-shaped section, the hollow seal portion 12a and the lip-shaped sub seal portion 12b.

The base portion 11 is made of solid rubber such as ethylene propylene solid rubber and the seal portions 12a and 12b are made of sponge rubber such as sponge rubber of ethylene propylene.

The core member 14 is made of synthetic resin and is provided with projecting portions 140 which project from a V-shaped main portion. These projecting portions 140 act as the retaining lips retaining a flange of a vehicle body.

The V-shaped main portion is made of solid vinyl chloride while the projecting portions 140 is made of soft vinyl chloride.

The producing method of the sixth embodiment of the weather strip will be explained with reference to FIGS. 28 and 29.

At first, a core member 14 composed of a flat portion 14a made of solid vinyl chloride and projecting portions 140 made of soft vinyl chloride and projecting from one surface of the flat portion 14a, is prepared by integrally extruding method as shown in FIG. 28.

Next, in the flat portion 14a are formed slots 141 and holes 146 at regular intervals in the longitudinal direction thereof. And linear cuts 142 are also formed in the flat portion 14a from both ends of each slot 141 to both side ends of the flat portion 14a through the holes 146.

In the next process, the obtained core member 14 solid rubber of ethylene propylene and sponge rubber are integrally extruded to obtain an extruded body wherein the flat portion 14a is covered with solid rubber, projecting portions 140 project from one surface of the solid rubber and a hollow seal portion 12a and a lip-shaped sub-seal portion 12b each being made of sponge rubber, project from the other surface of the hard rubber as shown in FIG. 29.

To the extruded body is repeatedly applied bending stress in the direction perpendicular to the surface of the core member 14. The core member is broken in the cut lines 142 to be separated into a large number of core pieces. Thereafter, the portion enclosing the separated core pieces is bent to have a V-shaped section. Thus, the weather strip 1 shown in FIG. 27 is obtained.

Figure 30:
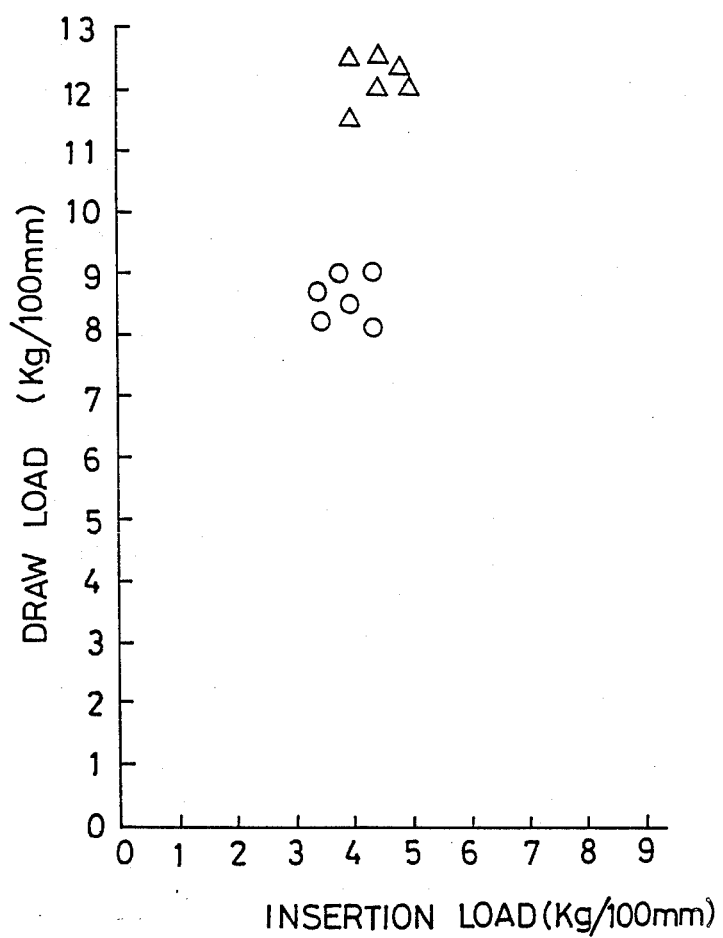
FIG. 30 is a graph showing the experimental result on the weather strip shown in FIG. 27.

FIG. 30 is a graph showing the experimental result on the relation between the load applied from the lips to the inserted flange (insertion load) and that applied from the lips to the drawn flange (draw load) in the weather strip of the present invention and the conventional weather strip wherein the separated metallic core pieces are embedded in the base portion made of ethylene propylene solid rubber.

In the experiment, a coated sheet metal of 0.7 mm thickness and 100 mm length as the flange was inserted into and drawn from the interior of the base portion 11 at an inserting speed of 20 mm/min and a drawing speed of 100 mm/min.

Marks Δ show the experimental results of the weather strip of the present invention and marks o show those of the conventional weather strip.

As is apparent from FIG. 30, the weather strip of the present invention exhibits much higher retaining force and accordingly excellent sealing property as compared with the conventional weather strip with the inserting load equal to the conventional weather strip.

What is claimed is:

1. A method for producing a weather strip composed of a channel shaped base portion, a seal portion projecting from an outer surface of said base portion, and a partially connected core member embedded in said base portion in its longitudinal direction, comprising:
supplying a core member made of a strip-shaped thermoplastic synthetic resin sheet and having transversely extending slots at regular intervals in the longitudinal direction of said core member;
integrally extruding said core member with rubber material to obtain an extruded body;
heating said extruded body to thereby soften said extruded core member and cure said extruded rubber material;
bending said extruded core member while said extruded core member remains softened with said rubber material to have a U-shaped cross section thereby to form said base portion; and
cooling said bent extruded body having said formed base portion.

2. A method according to claim 1, wherein in the step of heating, said extruded body is subjected to high frequency dielectric heating and then is kept at a predetermined temperature.

3. A method for producing a weather strip composed of a channel-shaped base portion, a seal portion projecting from an outer surface of said base portion, and a partially or totally disconnected core member embedded in said base portion in its longitudinal direction, comprising:
supplying a core member made of a strip-shaped thermoplastic synthetic resin sheet and having stress concentrating portions which are broken when bending stress is applied to said core member at regular intervals in the longitudinal direction of said core member;
integrally extruding said core member with rubber material to obtain an extruded body;
heating said extruded body by subjecting said extruded body to high frequency dielectric heating and maintaining said extruded body at a predetermined temperature and thereby curing said rubber material;
cooling said cured extruded body and then breaking said stress concentrating portions to form core pieces by applying bending stress to said cured extruded body;
heating said core pieces so as to soften them and then bending said softened core pieces with said rubber material to have a U-shaped cross section thereby to form said base portion; and
cooling said extruded body having said base portion.

4. A method for producing a weather strip composed of a channel-shaped base portion, a seal portion projecting from an outer surface of said base portion, and a partially or totally disconnected core member embedded in said base portion in its longitudinal direction, comprising:
supplying a core member made of a strip-shaped thermoplastic synthetic resin sheet and having stress concentrating portions which are broken when bending stress is applied to said core member at regular intervals in the longitudinal direction of said core member;
integrally extruding said core member with rubber material to obtain an extruded body;
heating said extruded body by subjecting said extruded body to high frequency dielectric heating and maintaining said extruded body at a predetermined temperature and thereby curing said rubber material;
gradually cooling said cured extruded body, until said cured extruded body reaches a half-hardened state and then breaking said stress concentrating portions to form core pieces by applying bending stress to said cured extruded body;
bending said core pieces with said rubber material to have a U-shaped cross section thereby to form said base portion; and
cooling said extruded body having said base portion.

5. A method according to claim 4, wherein said cured extruded body is pre-bent at a bending angle smaller than that of said base portion before said core member reaches said half-hardened state.

6. A method according to claim 4, wherein said core member is heated and pre-bent at a bending angle smaller than that of said base portion in the step of supplying said core member supply.

7. A method for producing a weather strip composed of a channel-shaped base portion, a seal portion projecting from an outer surface of said base portion, and a partially or totally disconnected core member embedded in said base portion in its longitudinal direction, comprising:
supplying a core member made of a strip-shaped thermoplastic synthetic resin sheet and having stress concentrating portions which are broken when bending stress is applied to said core member at regular intervals in the longitudinal direction of said core member;
integrally extruding said core member with rubber material to obtain an extruded body;
heating said extruded body and thereby curing said rubber material;
cooling said cured extruded body and then breaking said stress concentrating portions to form core pieces by applying bending stress to said cured extruded body;
heating said core pieces so as to soften them and then bending said softened core pieces with said rubber material to have a U-shaped cross section thereby to form said base portion; and cooling said extruded body having said base portion.

8. A method for producing a weather strip composed of a channel-shaped base portion, a seal portion projecting from an outer surface of said base portion, and a partially or totally disconnected core member embedded in said base portion in its longitudinal direction, comprising:

supplying a core member made of a strip-shaped thermoplastic synthetic resin sheet and having stress concentrating portions which are broken when bending stress is applied to said core member at regular intervals in the longitudinal direction of said core member;

integrally extruding said core member with rubber material to obtain an extruded body;

heating said extruded body and thereby curing said rubber material;

gradually cooling said cured extruded body, until said cured extruded body reaches a half-hardened state and then breaking said stress concentrating portions to form core pieces by applying bending stress to said cured extruded body;

bending said core pieces with said rubber material to have a U-shaped cross section thereby to form said base portion; and cooling said extruded body having said base portion.

* * * * *